United States Patent Office 2,764,910
Patented Oct. 2, 1956

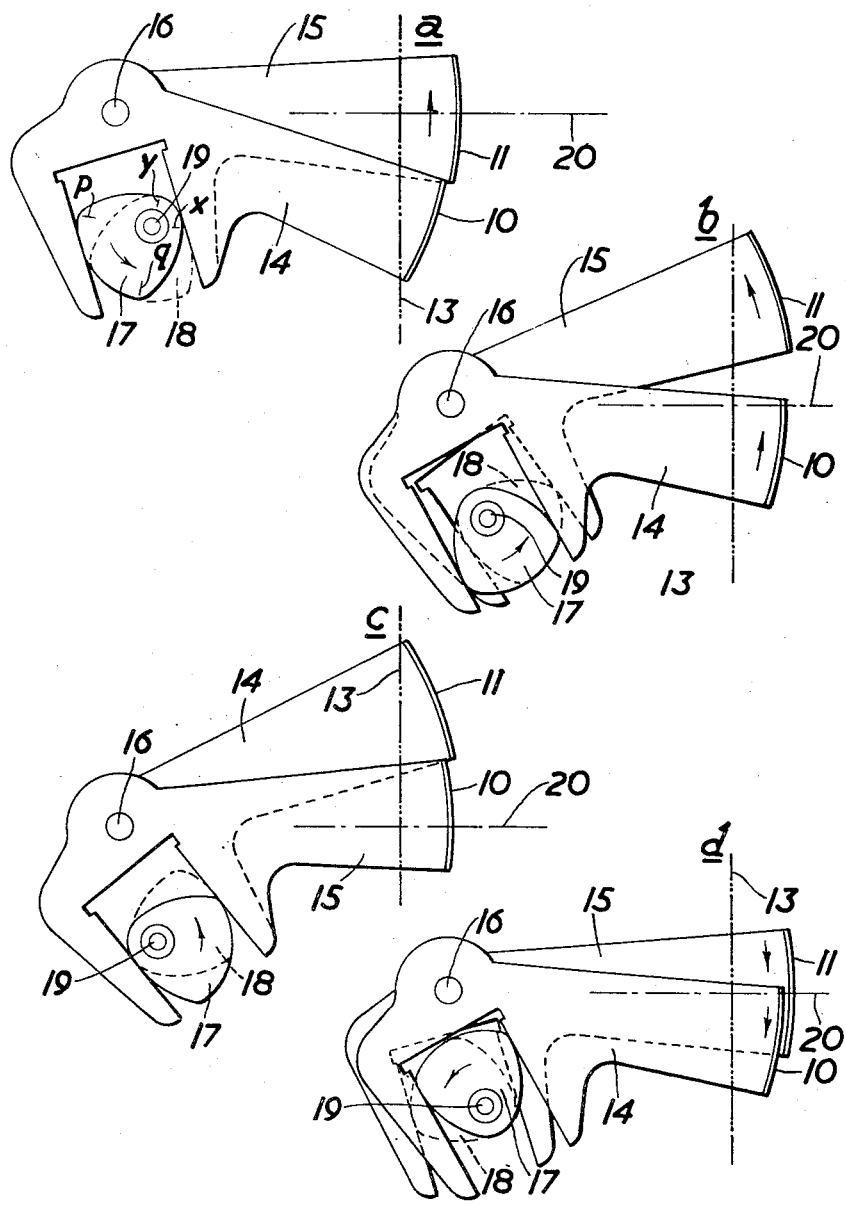
FIG. I.

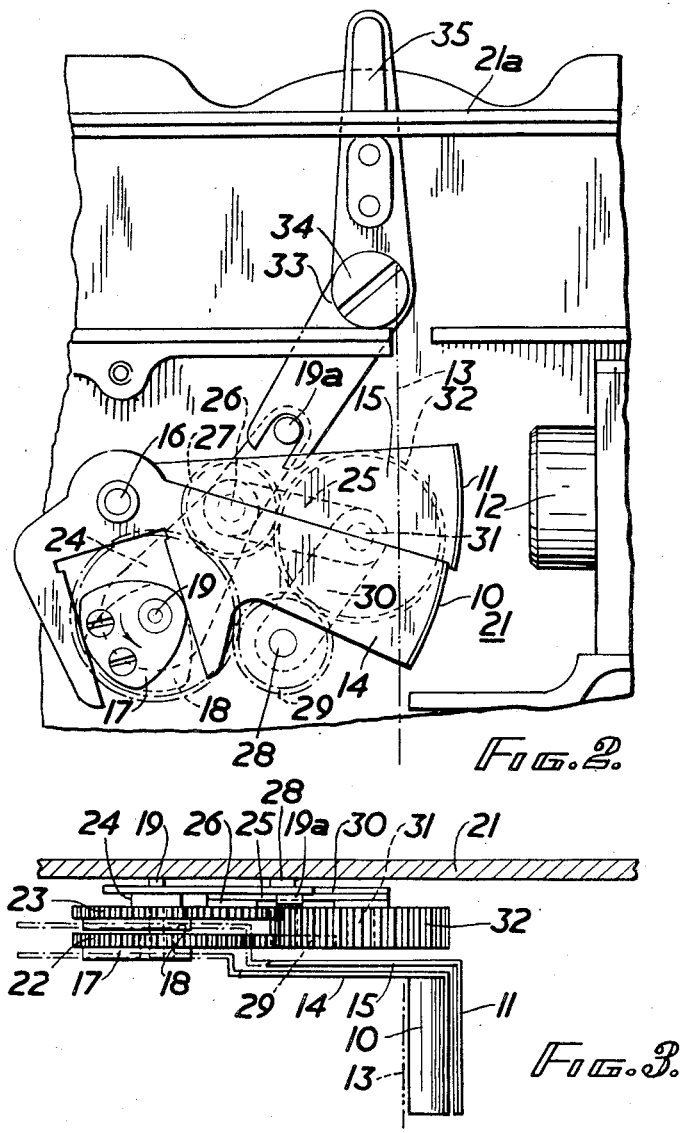

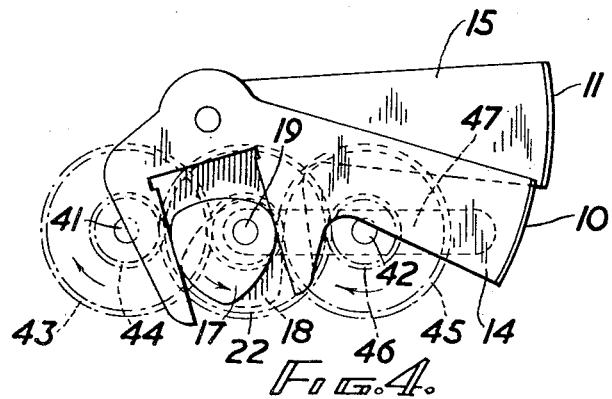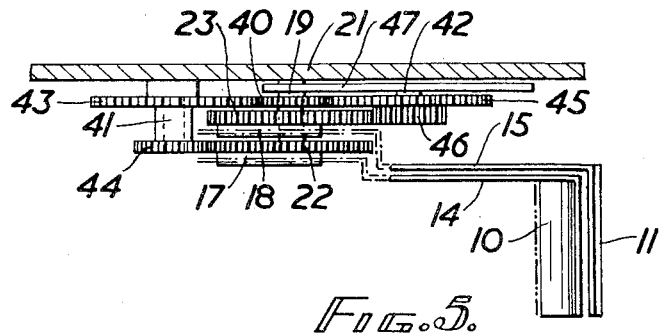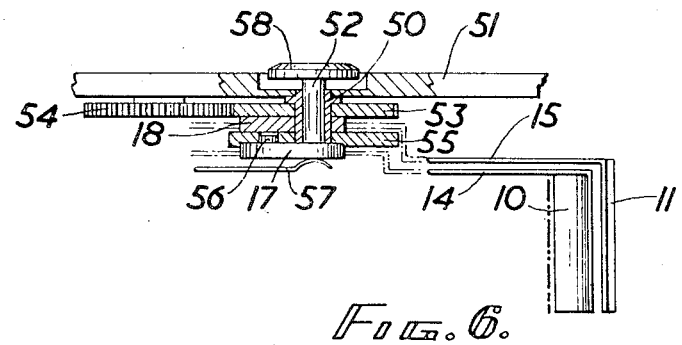

2,764,910

SHUTTERS FOR CINEMATOGRAPH CAMERAS

Donald Kenneth Tole and Sidney Vernon Cronin, Windsor, England, assignors to Specto Limited, Windsor, England, a British company Application August 27, 1952, Serial No. 306,582

3 Claims. (Cl. 88—19.3)

This invention relates to a shutter mechanism for cinematograph cameras, and provides an improved mechanism in which means can be incorporated for varying the duration of the exposure obtained at a given operating speed of the camera.

According to the invention, the shutter mechanism comprises two shutter blades disposed between the film to be exposed and the lens system of the camera, and two cams, of similar shape and adapted to be driven at the same speed, by means of which the blades are reciprocated in such a manner that during movement in one direction the blades are overlapping and during movement in the opposite direction there is a space between the blades which space constitutes an exposure aperture, the duration of the exposure depending, for a given speed of the cams, on their angular relationship.

Three embodiments of the invention will now be described, each embodiment incorporating a different form of means for varying the duration of the exposure. The embodiments are illustrated in the accompanying drawings in which:

Figures 1a, b, c and d are side views of the shutter proper and certain associated members common to all three embodiments, the parts being shown in various positions to illustrate the operation of the shutter;

Figures 2 and 3 are side and plan views of one embodiment of the invention;

Figures 4 and 5 are side and plan views of a second embodiment of the invention; and Figure 6 is a plan view of a third embodiment.

Referring first to Figures 2 and 3, the shutter proper is provided by two shutter blades 10 and 11 disposed between the lens assembly 12 (Figure 2) of the camera and the path of the film, the path of which is indicated by the chain-dotted line 13. Blades 10 and 11 are carried by fork members 14 and 15 respectively, the fork members being mounted for independent pivotal movement on a pin 16 (Figure 2). The fork of member 14 embraces a constant diameter cam 17 and that of member 15 a similar cam 18 (shown in dotted lines in Figure 2). The cams are mounted for rotation on a common shaft 19 and are driven at the same speed. The duration of the exposure or the shutter speed can be varied by means, to be described hereinafter, which adjusts the angular relationship of the cams.

In operation, the rotation of cams 17, 18 causes the shutter blades 10, 11 to reciprocate in front of the film in such a way that, while moving in one direction, there is a space between the blades, which space constitutes the exposure aperture and while moving in the opposite direction the blades overlap. The manner in which the shutter operates to produce this effect will now be described with reference to Figure 1 in which the shutter blades, fork members and cams only are shown, the same reference numerals being employed. The film path and the axis of the lens system 12 are indicated in Figure 1 by the chain-dotted lines 13 and 20 respectively.

Figure 1a shows the shutter with the parts in their initial positions immediately prior to an exposure, Figure 1b shows the shutter during the exposure, Figure 1c the shutter at the completion of the exposure and in Figure 1d the shutter parts are shown during the return movement to the initial position 1a. The directions of movement of the cams and shutter blades are indicated by arrows.

It will be seen that each cam has two contour portions, each of constant radius; these portions are marked as pq and xy on cam 17 in Figure 1a. As long as the related fork member is in engagement with these portions (as fork member 14 is in Figure 1a) the coresponding shutter blade will remain stationary, while when the fork engages the portions py and xq the blade is moved up or down.

In Figure 1a, blade 11 has just commenced to move upwardly but it is overlapped by blade 10 which is still stationary. As the cams rotate further blade 11 will leave blade 10 so that there is a space between them, this space constituting the exposure aperture. At a time depending on the angular relationship of the cams, blade 10 will commence to move upwardly so that the aperture moves over the film to be exposed (Figure 1b). Since blade 11 started to move first it will complete its upward movement before blade 10, and will then remain stationary while blade 10 continues its upward movement. In due course, blade 10 will overlap blade 11 thus closing the shutter again and completing the exposure. This position is shown in Figure 1c in which it will be noted that both blades are stationary prior to commencing their downward movement. Again, blade 11 will move first and thus the overlapping of the blades will increase so that during the downward movement the blades are always overlapping to a greater or lesser extent and consequently no exposure occurs (Figure 1d). Finally, after one complete revolution of the cams, the shutter parts will again be in the position 1a immediately prior to the next exposure.

It will be appreciated that if the lag of blade 10 behind blade 11 is increased by changing the angular relationships of the cams then the time between the opening and closing of the blades will increase, i. e. the shutter will have a slower speed. In Figures 2 and 3 a shutter mechanism is shown which incorporates one form of adjusting means for varying the angular relationship of the cams. The parts of the shutter mechanism are mounted on a plate 21 forming part of the camera. The plate carries the stub shaft 19 on which cams 17 and 18 are freely rotatable, equal gears 22 and 23 being secured to the cams respectively. An arm 24 is pivoted on the shaft 19 and has a link 25 pivotally attached to it at 26. The pivot 26 carries a freely rotatable intermediate gear 27 meshing with cam gear 23. A second stub shaft 28 is provided on plate 21, this shaft having a second freely rotatable intermediate gear 29 equal to intermediate gear 27 and a pivoted link 30. The second intermediate gear 29 meshes with cam gear 22.

The two links 25 and 30 are pivotally secured together at 31, the pivot carrying a third freely rotatable intermediate gear 32 which is equal to the cam gears but wider so that it meshes with both of the equal gears 27 and 29. The cam gear 23 is driven through suitable gearing (not shown) from the camera motor, and the drive is transmitted to the other cam gear 22 by the epicyclic gear train formed by gears 27, 32 and 29 so that both gears are rotated at the same speed. Now, the linkage formed by arm 24, and links 25, 30 permits gear 27 to be rolled round gear 23 by turning arm 24 about shaft 19; the rolling motion of gear 27 rotates meshing gears 32, 29 and 22 and hence gear 22 is rotated relative to gear 23. In this way, the angular relationship of the cams 17 and 18 is altered and consequently the shutter speed is varied as subsequently explained.

A lever 33 pivoted to plate 21 by means of screw 34 is provided for operating the shutter speed adjusting means. The lever is bifurcated at its lower end to engage a stud 19a on the upper end of arm 24. The shutter speed could of course be made continuously variable, but it is preferred to have a number of suitable speeds (say three) and provide a corresponding number of setting notches in flanges 21a of plate 21. The lever 33 is positively located for each speed by means of a leaf spring 35 which engages the required notch.

Another embodiment of the invention is shown in Figures 4 and 5; this embodiment is generally similar to that already described differing only in the epicyclic gear train employed for shutter speed adjustment. On shaft 19, a gear 40 is freely mounted as well as the cams 17, 18 with their respective gears 22, 23.

There are provided two lay shafts 41 and 42, on each of which a similar pair of gears 43, 44 and 45, 46 are secured. The gear 40 is connected to cam gear 22 through gears 43 and 44 and to cam gear 23 through gears 45 and 46. The axis of lay shaft 41 is stationary, the shaft being mounted on plate 21. Lay shaft 42, however, is carried by a lever 47 pivoted on shaft 19, so that gears 45 and 46 can be revolved about gear 40 and cam gear 23 respectively by turning the lever. The drive from the camera motor is taken to gear 43 and by moving lever 47, cam gear 23 can be turned relative to cam gear 22 to alter the angle between the cams.

The two embodiments described above both permit the shutter speed to be varied while the camera is in operation, and also continuous variation of the shutter speed is possible. In a third embodiment of the invention a simpler adjusting means is employed, which means allow the shutter speed to be adjusted only when the camera is not operating, and with which stepwise variation only is possible. This embodiment is shown in Figure 6.

In this embodiment, the cams, fork members and shutter blades are provided as before and the shutter operates in the manner described with reference to Figure 1. The cams are supported somewhat differently however; in place of shaft 19 a stationary tubular axle 50 is attached to the inside of the camera casing 51 and a shaft 52 is arranged so as to be free to rotate and slide within the axle. The cam 17 is fast on shaft 52 and the cam 18 is rotatably mounted on the axle 50. A gear 53 is secured to cam 18 and is driven from the camera motor through gear 54. A disc 55 is also secured to cam 18 and has a circular series of apertures; cam 17 is provided with a stud 56 adapted to be received in any one of the apertures. The stud is maintained in a chosen aperture by a light spring blade 7 pressing on the end of shaft 52.

By means of this arrangement the drive is transmitted to cam 17 so that both cams are rotated at the same speed. In order to change the shutter speed, the shaft 52 is slid downwardly (Figure 6) by depressing the button 58; this causes stud 56 to be released from the aperture and then shaft 52 is turned by means of button 58 until the stud is opposite the aperture giving the required angle between the cams. On releasing button 52, spring 57 causes stud 56 to engage this aperture and the shutter will then operate at the required new speed.

What is claimed is:
1. A shutter mechanism for a cinematograph camera comprising a first shaft, a first constant diameter cam, a first gear secured to said first cam, said first cam and gear being mounted on said first shaft so as to be freely rotatable thereon, a second constant diameter cam of the same shape and size as said first cam, a second gear identical with said first gear and secured to said second cam, said second cam and gear being mounted on said first shaft so as to be freely rotatable thereon, two similar fork members mounted for independent pivotal movements about a common axis parallel to the axis of said first shaft, each fork member being of substantially L-shape, one limb constituting a fork which embraces with its forks the respective one of said cams for positive control by the latter and the other limb constituting a shutter blade, a lever pivoted on said first shaft, a third gear rotatably supported on said lever and meshing with said first gear, a second shaft parallel to said first shaft, a fourth gear identical with said third gear rotatably mounted on said second shaft and meshing with said second gear, a first link pivotally attached to said lever, a second link pivoted on said second shaft, a third shaft supported by said first and second links, a fifth gear rotatably supported on said third shaft and meshing with said third and fourth gears, and means for driving said first or second gear from the camera motor.

2. A shutter mechanism for a cinematograph camera comprising a first shaft, a first constant diameter cam, a first gear secured to said first cam, said first cam and gear being mounted on said first shaft so as to be freely rotatable thereon, a second constant diameter cam of the same shape and size as said first cam, a second gear identical with said first gear and secured to said second cam, said second cam and gear being mounted on said first shaft so as to be freely rotatable thereon, two similar fork members mounted for independent pivotal movements about a common axis parallel to the axis of said first shaft, each fork member being of substantially L-shape, one limb constituting a fork which embraces with its forks, the respected one of said cams for positive control by the latter and the other limb constituting a shutter blade, a third gear rotatably mounted on said first shaft, a lever pivoted on said first shaft, a second shaft carried by said lever, a fourth gear rotatably mounted on said second shaft and meshing with said third gear, a fifth gear also rotatably mounted on said second shaft and drivingly connected to said fourth gear, said fifth gear meshing with said first gear, a third shaft, a sixth gear identical with said fourth gear rotatably mounted on said third shaft and meshing with said third gear, a seventh gear identical with said fifth gear rotatably mounted on said third shaft and drivingly connected to said sixth gear, said seventh gear meshing with said second gear, and means for driving said sixth gear from the camera motor.

3. A shutter mechanism for a cinematograph camera comprising a first shaft, a first constant diameter cam, a first gear secured to said first cam, said first cam and gear being rotatably mounted on said first shaft, a second constant diameter cam of the same shape and size as said first cam, a second gear identical with said first gear and secured to said second cam, said second cam and gear being rotatably mounted on said first shaft, two similar fork members mounted for independent pivotal movement about a common axis parallel to the axis of said first shaft, one extremity of each work member operatively embracing one of said cams and the other extremity constituting a shutter blade, a third gear rotatably mounted on said first shaft, a lever pivoted on said first shaft, a second shaft carried by said lever, a fourth gear rotatably mounted on said second shaft and meshing with said third gear, a fifth gear also rotatably mounted on said second shaft and drivingly connected to said fourth gear, said fifth gear meshing with said first gear, a third shaft, a sixth gear identical with said fourth gear rotatably mounted on said third shaft and meshing with said third gear, a seventh gear identical with said fifth gear rotatably mounted on said third shaft and drivingly connected to said sixth gear, said seventh gear meshing with said second gear, and means for driving said sixth gear from the camera motor.

(References on following page)

References Cited in the file of this patent

UNITED STATES PATENTS

| | | | |
|---|---|---|---|
| 1,068,208 | Bingham | July 22, | 1913 |
| 1,129,327 | Bingham | Feb. 23, | 1915 |
| 1,151,760 | Cameron | Aug. 31, | 1915 |
| 2,271,235 | Stechbart | Jan. 27, | 1942 |
| 2,283,533 | Brueske | May 19, | 1942 |
| 2,283,586 | Stechbart | May 19, | 1942 |

FOREIGN PATENTS

| | | | |
|---|---|---|---|
| 237,795 | Switzerland | Sept. 1, | 1945 |
| 629,549 | Great Britain | Sept. 22, | 1949 |
| 704,172 | Great Britain | Feb. 17, | 1954 |